(No Model.)

A. E. McCONNELL.
CAR TRUCK.

No. 293,763. Patented Feb. 19, 1884.

WITNESSES:
John H. Deemer
C. Sedgwick

INVENTOR:
A. E. McConnell
BY
Munn & Co.
ATTORNEYS.

UNITED STATES PATENT OFFICE.

ALEXANDER E. McCONNELL, OF NEW ORLEANS, LOUISIANA.

CAR-TRUCK.

SPECIFICATION forming part of Letters Patent No. 293,763, dated February 19, 1884.

Application filed June 27, 1883. (No model.)

*To all whom it may concern:*

Be it known that I, ALEXANDER E. MCCONNELL, of New Orleans, in the parish of Orleans and State of Louisiana, have invented certain new and useful Improvements in Axle-Bearings for Railroad-Cars, of which the following is a full, clear, and exact description.

This invention relates to axle-bearings for cars and other vehicles running on railroads, in which the axle has its bearing upon or against superimposed wheels arranged to bear upon opposite sides of the journal of the axle above its center; and the invention consists in certain novel combinations and arrangements of a series of superimposed wheels and their axles and bearings with a series of car-axles in the same truck or frame, whereby not only friction is reduced, as also the wear of the bearings, and lubricating material is saved and the heating of axle-boxes prevented, but a diminished number of superimposed wheels and their axles suffices, and said wheels are made to run steadier, and are exposed, or certain of them, to a counteracting lateral pressure, substantially as hereinafter described, and pointed out in the claim.

Reference is to be had to the accompanying drawings, forming part of this specification, in which similar letters of reference indicate corresponding parts in all the figures.

Figure 1:
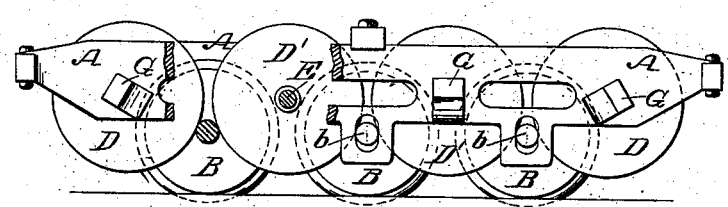
Figure 2:
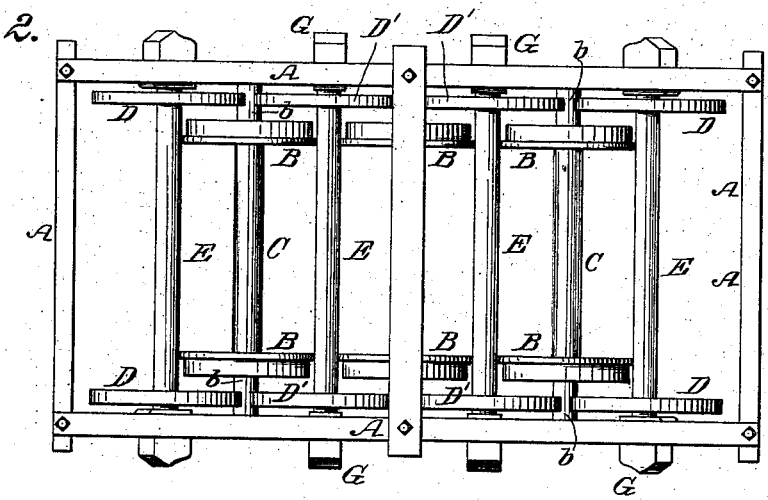
Figure 3:
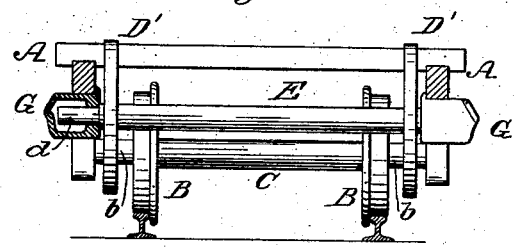

Figure 1 represents a partly-broken side view of a railroad-car truck with my invention applied. Fig. 2 is a plan of the same, and Fig. 3 is a vertical transverse section thereof, with one of the boxes in section.

A in the drawings indicates the frame of a railroad-car truck having three pairs—that is, six running-wheels, B B; but the invention is not restricted to any special number of said wheels.

C C are the axles of the wheels B B, fitted so as to be capable of free play up and down within the frame A, or, rather, free movement up and down of said frame relatively to them, and having journals $b\ b$, upon or against opposite sides of which, above the axial center of them, superimposed wheels D D' run and form bearings therefor. These superimposed wheels D D' are made of as large diameter as is practicable or convenient, and so that such as are intermediate of the car-axle journals $b\ b$ on the same side of the frame will each act as a slowly-rolling bearing for and on opposite sides of the center of the journals of two adjacent axles. This is clearly shown for the superimposed wheels D' D' in Fig. 1, and by such arrangement said wheels D' D' will be relieved of one-sided pressure, or, rather, be exposed to counteracting pressures on opposite sides of their centers. Likewise the number of superimposed wheels necessary to form rolling bearings for the several car-axles will be reduced over or as compared with providing separate opposite bearing-wheels for each car-axle journal. The enlarged size of the wheels D D', too, will cause their journals, or, rather, journals of their axles, to turn at such a reduced velocity in the boxes provided for them as that said journals will have but very little friction, and neither they nor their boxes will be liable to heat. Furthermore, the superimposed wheels D D' are connected in pairs on opposite sides of the truck or frame by a single axle, E, for each pair, such axles being arranged to extend wholly across the truck-frame. This will cause said superimposed wheels to run much steadier than if their axles were supported only on one side of the frame, and by the hereinbefore-specified arrangement of said wheels, whereby each intermediate one bears upon two adjacent car-axle journals, the number of axles and their boxes for the superimposed wheels is proportionately reduced. The journals $d$ of the axles E slowly rotate in boxes G provided for the purpose, and which may be constructed as car-axle boxes have heretofore been constructed, to provide for lubrication of the journals $d$; but as the axles E will only rotate at the diminished velocity due to the difference in diameters of the journals $b$ of the car-axles and the wheels D D', the journals of said axles E and their boxes G will be exposed to very little friction.

By this invention a large saving will be effected in the usual brass or other metal boxes of car-axles, as well as a great saving of grease or oil and waste, and the heating of journals and their boxes to any dangerous or objectionable extent will be done away with.

The drawings, it will be observed, show a six-wheel railway-truck, and the invention is such that four pairs of connected superimposed bearing-wheels will support the journals of the axles of the six running-wheels. The lateral motion of the truck is controlled by the ends of the axles of the wheels B B, arranged to press against brass or other blocks placed in the box of said axles.

I do not abandon or dedicate to the public any patentable feature set forth herein and not hereinafter claimed; but reserve the right to claim the same either in a reissue of any patent that may be granted upon this application or in other applications for Letters Patent that I may make.

Having thus described my invention, what I claim as new, and desire to secure by Letters Patent, is—

The combination, in a railroad-car truck or frame, A, of the axles C and running-wheels B thereon, the superimposed wheels D D', arranged to run upon opposite sides of the journals b of said axles, and so that each intermediate wheel, D', bears against the journals of two adjacent axles, C, and the axles E arranged to connect the superimposed wheels D D' upon opposite sides of the truck or frame, substantially as specified.

ALEX. E. McCONNELL.

Witnesses:
ANDREW HERO,
O. P. McCAN.